(12) United States Patent
Ikeyama et al.

(10) Patent No.: US 11,254,347 B2
(45) Date of Patent: Feb. 22, 2022

(54) RACK BUSH AND STEERING MECHANISM

(71) Applicants: MAZDA MOTOR CORPORATION, Hiroshima (JP); OILES CORPORATION, Tokyo (JP)

(72) Inventors: Gaku Ikeyama, Hiroshima (JP); Junya Kuwagaki, Hiroshima (JP); Hiroyuki Kikuchi, Fujisawa (JP); Toshihiko Sekine, Fujisawa (JP); Noboru Nakagawa, Fujisawa (JP); Katsunori Saito, Fujisawa (JP); Kosuke Shimayama, Fujisawa (JP)

(73) Assignees: MAZDA MOTOR CORPORATION, Hiroshima (JP); OILES CORPORATION, Tokyo (JP)

( * ) Notice: Subject to any disclaimer, the term of this patent is extended or adjusted under 35 U.S.C. 154(b) by 37 days.

(21) Appl. No.: 16/757,432

(22) PCT Filed: Oct. 17, 2018

(86) PCT No.: PCT/JP2018/038666
§ 371 (c)(1),
(2) Date: Apr. 20, 2020

(87) PCT Pub. No.: WO2019/078254
PCT Pub. Date: Apr. 25, 2019

(65) Prior Publication Data
US 2021/0188341 A1 Jun. 24, 2021

(30) Foreign Application Priority Data
Oct. 20, 2017 (JP) .............................. JP2017-203677

(51) Int. Cl.
*B62D 3/12* (2006.01)
*B62D 7/22* (2006.01)
*F16C 31/02* (2006.01)

(52) U.S. Cl.
CPC ............... *B62D 3/12* (2013.01); *B62D 7/226* (2013.01); *F16C 31/02* (2013.01)

(58) Field of Classification Search
CPC .............................. B62D 3/12; F16C 2326/24
See application file for complete search history.

(56) References Cited

U.S. PATENT DOCUMENTS

| 4,215,591 | A | 8/1980 | Bishop |
| 2010/0239199 | A1* | 9/2010 | Nakagawa .............. F16C 17/02 384/283 |

(Continued)

FOREIGN PATENT DOCUMENTS

| EP | 3 006 750 | 4/2016 |
| JP | 4-135874 | 12/1992 |

(Continued)

OTHER PUBLICATIONS

Machine Translation of JP 2007-009962.*
International Search Report for PCT/JP2018/038666 dated Jan. 15, 2019, 5 pages.

*Primary Examiner* — Richard W Ridley
*Assistant Examiner* — Brian J McGovern
(74) *Attorney, Agent, or Firm* — Nixon & Vanderhye P.C.

(57) ABSTRACT

Provided is a rack bush capable of reducing an effect on the feeling of a steering operation. A rack bush (1) comprises: a rack bush 1 housed in a cylindrical housing (4), which supports a load applied to a rack bar (5) while allowing movement of the rack bar (5) in the direction of the axis (O) and can be freely expanded and contracted in the radial direction; and elastic rings (3) mounted on the bush body (2). The bush body (2) has mounting grooves (28), which are formed in the circumferential direction on an outer peripheral surface (22) for mounting the elastic ring (3). An axis (P) of the mounting groove (28) are shifted from the axis (O) of the bush body (2). By this arrangement, there are formed (Continued)

an elastic ring protruding part (10), where the elastic rings (3) protrude greatly from the outer peripheral surface (22) of the bush body (2), and an elastic ring embedded part (11), where the elastic rings (3) are embedded in the outer peripheral surface (22) of the bush body (2).

3 Claims, 6 Drawing Sheets

(56) References Cited

U.S. PATENT DOCUMENTS

| | | | |
|---|---|---|---|
| 2011/0016997 A1* | 1/2011 | Oki | B62D 3/12 |
| | | | 74/29 |
| 2012/0242054 A1* | 9/2012 | Shiraishi | B62D 3/12 |
| | | | 280/93.514 |
| 2015/0204381 A1 | 7/2015 | Zaike et al. | |
| 2015/0251685 A1* | 9/2015 | Oda | F16C 29/02 |
| | | | 74/422 |
| 2016/0059883 A1* | 3/2016 | Mizutani | F16C 33/20 |
| | | | 74/422 |
| 2017/0050666 A1* | 2/2017 | Kawakubo | B62D 3/123 |
| 2019/0359252 A1* | 11/2019 | Yu | G06F 17/142 |
| 2020/0346681 A1* | 11/2020 | Sekine | F16C 29/002 |

FOREIGN PATENT DOCUMENTS

| | | | | |
|---|---|---|---|---|
| JP | 2007009962 A | * | 1/2007 | ............ F16C 29/002 |
| JP | 2008-151289 | | 7/2008 | |
| JP | 2015-137721 | | 7/2015 | |
| WO | 2014/196582 | | 12/2014 | |

\* cited by examiner

RACK BUSH AND STEERING MECHANISM

This application is the U.S. national phase of International Application No. PCT/JP2018/038666 filed Oct. 17, 2018 which designated the U.S. and claims priority to JP Patent Application No. 2017-203677 filed Oct. 20, 2017, the entire contents of each of which are hereby incorporated by reference.

TECHNICAL FIELD

The present invention relates to a rack-and-pinion steering mechanism, and in particular relates to a rack bush used in the rack-and-pinion steering mechanism.

BACKGROUND ART

The Patent Literature 1 describes a rack bush used in a rack-and-pinion steering mechanism. This rack bush is housed in a cylindrical housing in a state that movement in the axial direction is restricted, and supports the load applied to a rack bar while allowing movement of the rack bar in the axial direction. The rack bush comprises: a cylindrical bearing body, which can be freely expanded and contracted in the radial direction, and into which the rack bar is inserted; and elastic rings, which are mounted on the bearing body and bias the bearing body inward in the radial direction. The bearing body is made of synthetic resin, and mounting grooves for mounting the elastic rings are formed in the outer peripheral surface of the bearing body, each in the circumferential direction.

According to this rack bush, the bearing body is contracted in diameter by the elastic rings so that the rack bar inserted in the bearing body is tightened. As a result, the clearance between the inner peripheral surface of the bearing body and the outer peripheral surface of the rack bar is made to be zero, and thus it is possible to prevent generation of unpleasant sound owing to collision between the inner peripheral surface of the bearing body and the outer peripheral surface of the rack bar. Further, it is possible to prevent variation in the friction torque caused by a dimension error of the outer diameter of the rack bar.

CITATION LIST

Patent Literature

Patent Literature 1: Japanese Unexamined Patent Application Laid-Open No. 2008-151289

SUMMARY OF INVENTION

Technical Problem

When a steering shaft is rotated by steering operation in a rack-and-pinion steering mechanism, the rotational movement of the steering shaft is converted into the linear movement of the rack bar owing to engagement between a pinion gear formed in the end portion of the steering shaft and a rack gear formed in the rack bar. As a result, tie rods interlocked with the rack bar give torque for rotating tires around their kingpins to steering knuckles via the tie rod ends. At that time, reaction force from the tires is inputted into the rack bar via the steering knuckles, the tie rod ends, and the tie rods.

Figures 6A, 6B:
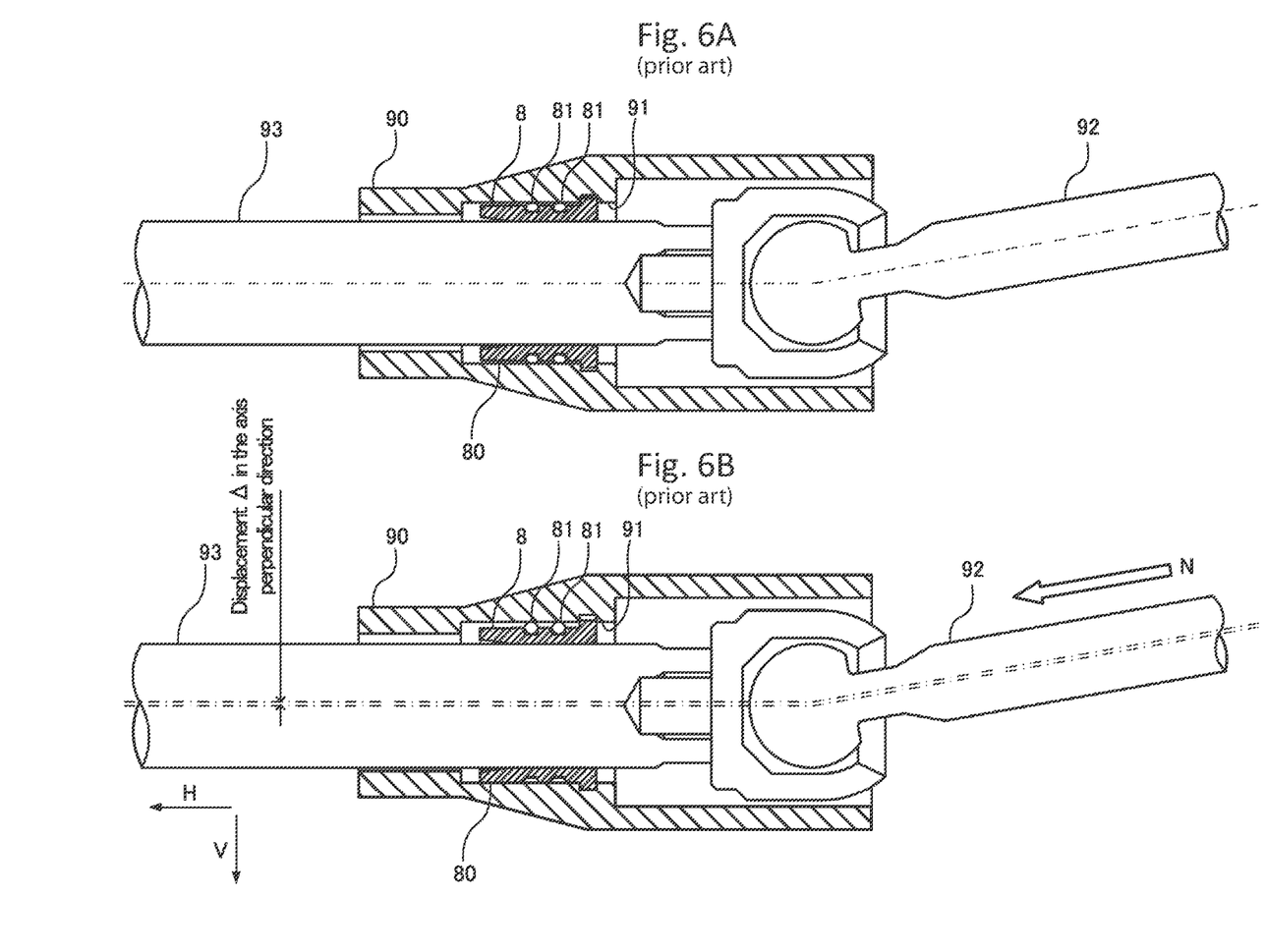
FIGS. 6(A) and 6(B) are views for explaining a problem of the conventional rack bush 8.

Here, as shown in FIG. 6(A), a rack bush 8 described in Patent Literature 1 is housed in a housing 90 so that an elastic ring 81 mounted on a bearing main body 80 contacts an inner peripheral surface 91 of the housing 90. By this arrangement, as shown in FIG. 6(B), the elastic ring 81 is compressed and deformed by the reaction force N from a tire input to a rack bar 93 via a tie rod 92. Thus, before the rack bar 93 linearly moves in the rack axis direction H, the rack bush 8, the rack bar 93, and the tie rod 92 are displaced in the rack axis perpendicular direction V (displacement Δ in the axis perpendicular direction). Accordingly, the time lag from the steering operation to actual change of the directions of the tires becomes larger, and this affects feeling of steering operation unfavorably.

The present invention has been made taking the above conditions into consideration, and an object of the invention is to provide a rack bush that can reduce a bad effect on the feeling of steering operation.

Solution to Problem

To solve the above problems, according to the present invention, a mounting groove for mounting an elastic ring is formed in the circumferential direction in the outer peripheral surface of a bush body through which a rack bar is inserted, so as to shift an axis of the mounting groove from an axis of the bush body. Here, it is preferable that the amount of deviation of the axis of the mounting groove from the axis of the bush body is set so that a sum of the radius of the outer peripheral surface of the bush body and the amount of deviation of the axis of the mounting groove from the axis of the bush body is larger than or equal to a sum of a radius of a groove bottom of the mounting groove and a wire diameter of the elastic body constituting the elastic ring.

For example, the present invention provides a rack bush, comprising:

a bush body, which can be freely expanded and contracted in a radial direction; and an elastic ring mounted on the bush body, wherein:

the bush body has a mounting groove formed in an outer peripheral surface in a circumferential direction for mounting the elastic ring; and an axis of the mounting groove is shifted from an axis of the bush body.

Further, the present invention provides a rack-and-pinion steering mechanism, comprising:

the above-mentioned rack bush, which supports a load applied to a rack bar while allowing movement of the rack bar in an axial direction; and a cylindrical housing, which houses the rack bush while restricting movement of the rack bush in the axial direction, wherein:

the rack bush is housed in the housing so that the axis of the bush body is located closer to a reaction force supporting surface, which is an inner peripheral surface of the housing opposed to an input direction of a reaction force inputted to the rack bar from a tire via a tie rod linked to the rack bar, than the axis of the mounting groove.

Advantageous Effects of Invention

According to the present invention, the mounting groove for mounting the elastic ring has the axis shifted from the axis of the bush body. As a result, there are formed an elastic ring protruding part where the elastic ring protrudes largely from the outer peripheral surface of the bush body and an elastic ring embedded part where the elastic ring is embedded in or protrudes small from the outer peripheral part of the bush body. By mounting the rack bush in the housing so that the elastic ring embedded part is opposed to the reaction force supporting surface, which is the inner peripheral surface of the housing opposed to the input direction of reaction force inputted to the rack bar from a tire via a tie rod, the outer peripheral surface of the bush body and the reaction force supporting surface can be directly contacted without the intervention of the elastic ring, or the gap between the outer peripheral surface of the bush body and the reaction force supporting surface can be reduced. Accordingly, the rigidity against reaction force of tire is improved, and movement of the rack bar within the housing owing to the reaction force of tire can be restricted, and therefore the time lag from steering operation to actual change of the tire direction is reduced. Further, in the present invention, since it is not necessary to shorten the circumference of the elastic ring on the inner peripheral side to strengthen tightening of the rack bar for improvement of the rigidity against reaction force of tire, the sliding characteristics of the rack bush are not affected. Thus, the present invention can provide a rack bush that can reduce the effect on the feeling of steering operation.

DESCRIPTION OF EMBODIMENTS

In the following, one embodiment of the present invention will be described referring to the drawings.

Figure 1:
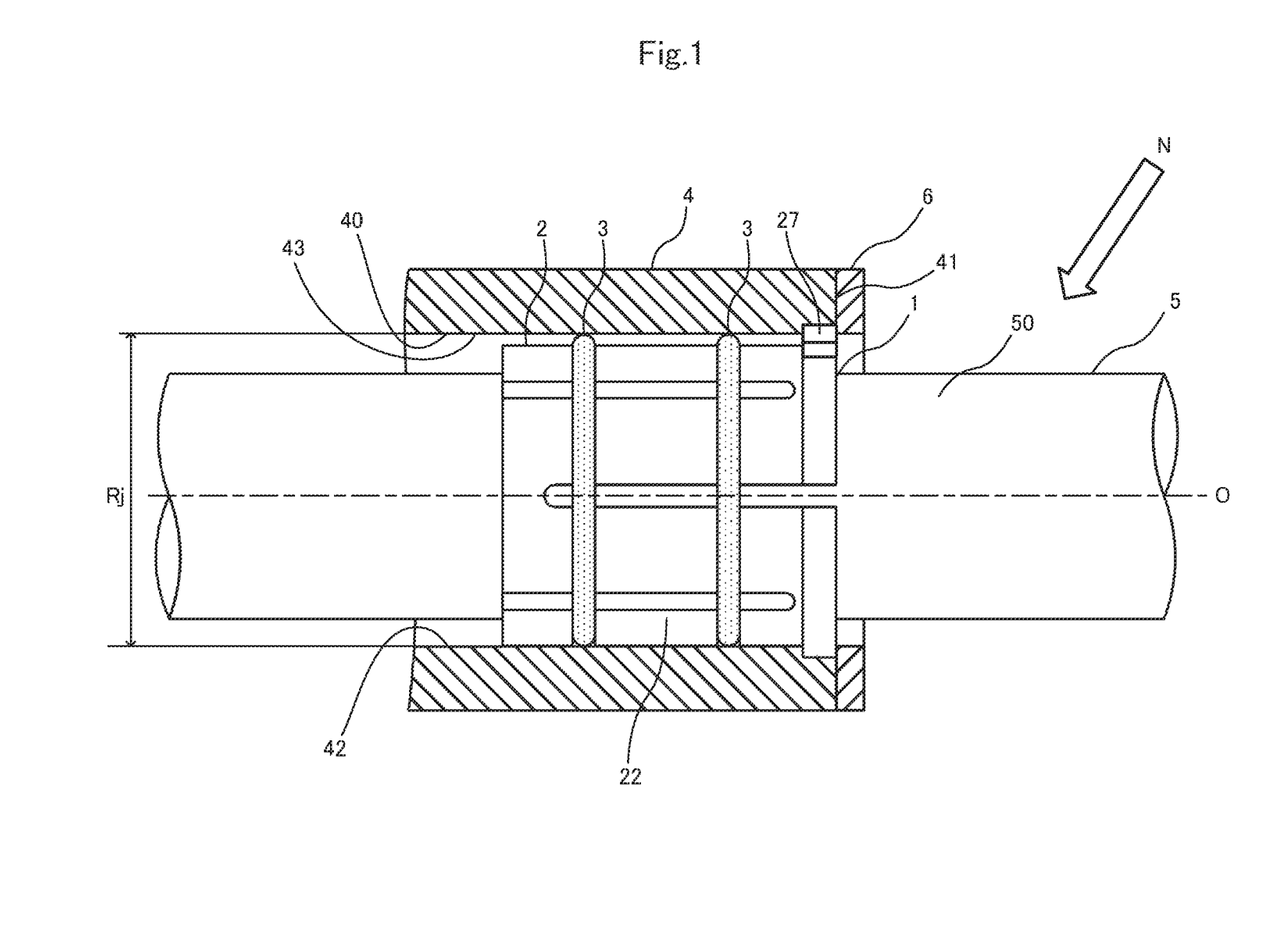
FIG. 1 is a partial cross-section view of a part of a rack-and-pinion steering mechanism according to one embodiment of the present invention.

FIG. 1 is a partial cross-section view of a part of a rack-and-pinion steering mechanism according to the present embodiment.

As shown in the figure, the rack-and-pinion steering mechanism of the present embodiment comprises: a rack bush 1, which supports a load applied to a rack bar 5 while allowing movement of the rack bar 5 in the direction of the axis O; and a cylindrical housing 4, which houses the rack bush 1 while restricting movement of the rack bush 1 in the direction of the axis O.

Figure 2A:
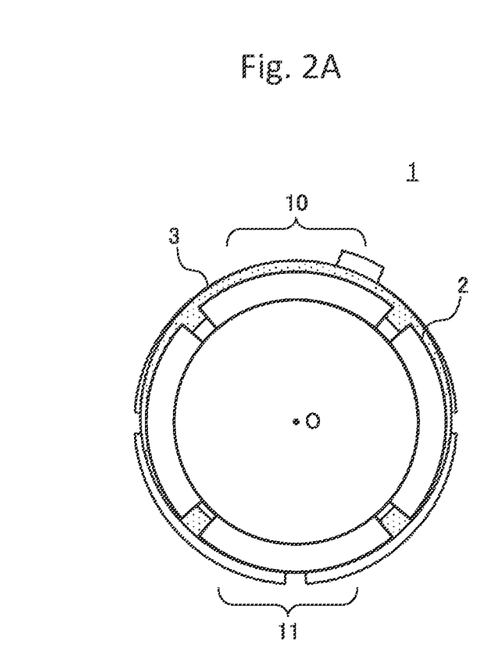
FIGS. 2(A) and 2(B) are respectively a front view and a side view of a rack bush 1.
Figure 2B:
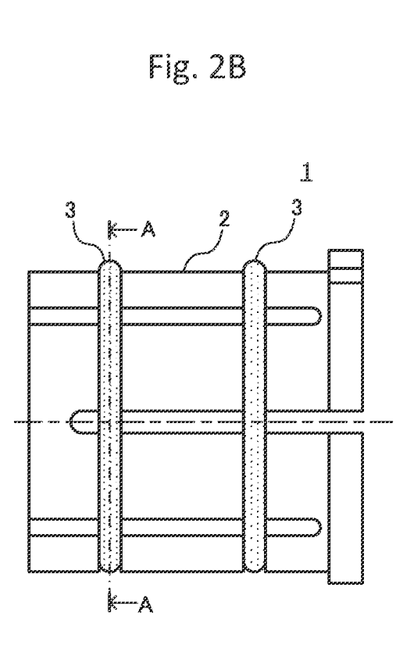
Figure 2C:
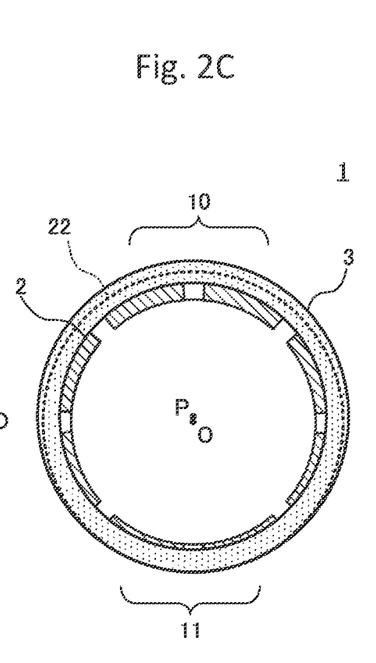
FIG. 2(C) is an A-A cross-section view of the rack bush 1 shown in FIG. 2(B)

FIGS. 2(A) and 2(B) are respectively a front view and a side view of the rack bush 1, and FIG. 2(C) is an A-A cross-section view of the rack bush 1 shown in FIG. 2(B).

As shown in the figures, the rack bush 1 comprises: a bush body 2 through which the rack bar 5 is inserted; and elastic rings 3 mounted on the bush body 2. Although the present embodiment shows an example in which two elastic rings 3 are mounted on the bush body 2, it is possible that one, three, or more elastic rings 3 are mounted on the bush body 2.

Figures 3A, 3B, 3C, 3D, 3E:
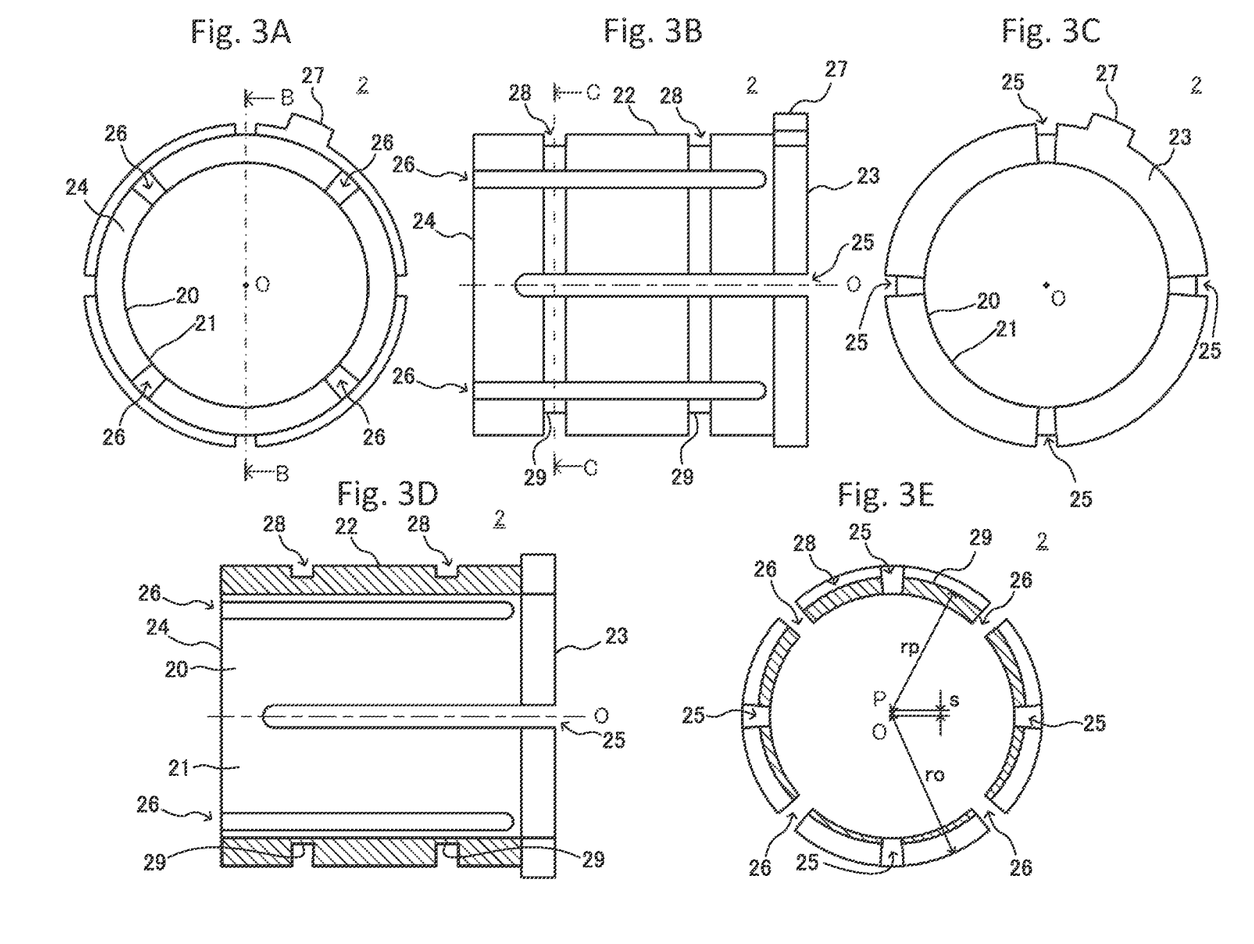
FIGS. 3(A), 3(B), and 3(C) are respectively a front view, a side view, and a back view of a bush body 2.
FIG. 3(D) is a B-B cross-section view of the bush body 2 shown in FIG. 3(A)
FIG. 3(E) is a C-C cross-section view of the bush body 2 shown in FIG. 3(B)

FIGS. 3(A), 3(B), and 3(C) are respectively a front view, a side view, and a back view of the bush body 2, FIG. 3(D) is a B-B cross-section view of the bush body 2 shown in FIG. 3(A), and FIG. 3(E) is a C-C cross-section view of the bush body 2 shown in FIG. 3(B).

The bush body 2 is formed of synthetic resin having good sliding characteristics such as polyacetal resin, polyamide resin, polyethylene resin, or the like, and is a cylindrical member, which can be freely expanded and contracted in the radial direction. As shown in the figure, the bush body 2 comprises: a sliding surface 21, which is formed in an inner peripheral surface 20 and comes in sliding contact with an outer peripheral surface 50 of the rack bar 5 inserted; a plurality of first slits 25 and second slits 26, which are arranged alternately in the circumferential direction at regular intervals; an engagement protrusion 27, which is formed on an outer peripheral surface 22; and mounting grooves 28, which are formed in the outer peripheral surface 22 in the circumferential direction in order to mount the elastic rings 3.

The first slits 25 are each formed along the direction of the axis O from one end surface 23 toward the other end surface 24, and the second slits 26 are each formed along the direction of the axis O from the other end surface 24 toward the one end surface 23. The bush body 2 can be deformed in the diameter contracting direction owing to the plurality of first slits 25 and second slits 26 arranged alternately in the circumferential direction at regular intervals.

The engagement protrusion 27 protrudes outward in the radial direction from the outer peripheral surface 22 on the side of the one end surface 23, and is received in an engagement recess (not shown), which is formed to cut off the inner peripheral surface 40 at one end surface 41 of the housing 4. By this arrangement, the rack bush 1 housed in the housing 4 is restricted in rotation around the axis O. Further, a ring-shaped lid 6 is attached to the one end surface 41 of the housing 4 in a state that the engagement protrusion 27 is received in the engagement recess of the housing 4. As a result, the rack bush 1 housed in the housing 4 is restricted in movement in the direction of the axis O (See FIG. 1).

Each of the mounting grooves 28 is formed in the outer peripheral surface 22 along the circumferential direction, and an axis P of a groove bottom 29 of the mounting groove 28 is shifted from the axis O of the bush body 2. Here, expressing the radius of the outer peripheral surface 22 as ro, the radius of the groove bottom 29 of the mounting groove 28 as rp, and the wire diameter of the elastic body forming the elastic ring 3 as d (See FIG. 4), displacement s between the axis P of the groove bottom 29 of the mounting groove 28 and the axis O of the bush body 2 is set so that ro+s=>rp+d. As a result, in the rack bush 1, there are formed an elastic ring protruding part 10, where the elastic rings 3 protrude largely from the outer peripheral surface 22 of the bush body 2 on the side of the axis P of the mounting groove 28 with respect to the axis O of the bush body 2, and an elastic ring embedded part 11, where the elastic rings 3 are embedded in the outer peripheral surface 22 of the bush body 2 on the side of the axis O of the bush body 2 with respect to the axis P of the mounting groove 28 (See FIG. 2).

Figure 4A:
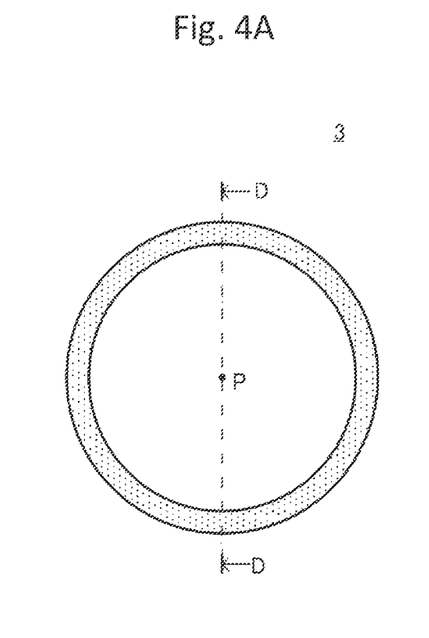
FIGS. 4(A) and 4(B) are respectively a front view and a side view of an elastic ring 3.
Figure 4B:
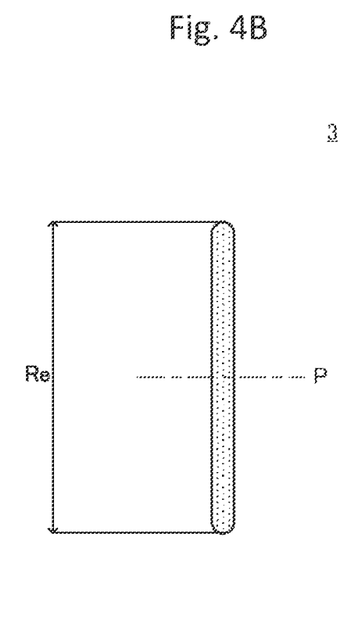
Figure 4C:
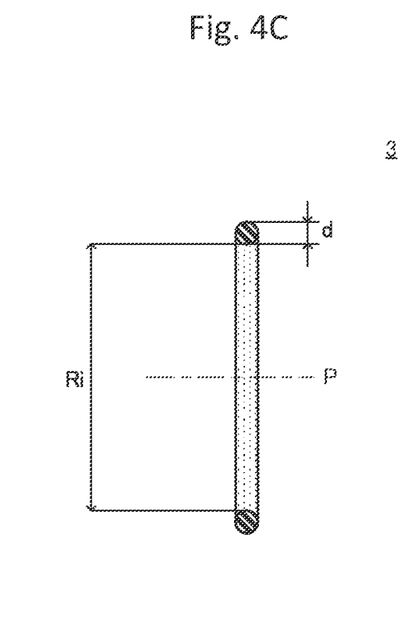
FIG. 4(C) is a D-D cross-section view of the elastic ring 3 shown in FIG. 4(A)

FIGS. 4(A) and 4(B) are respectively a front view and a side view of each elastic ring 3, and FIG. 4(C) is a D-D cross-section view of the elastic ring 3 shown in FIG. 4(A).

Each elastic ring 3 is an annular member formed of an elastic body such as synthetic rubber, thermoplastic elastomer, or the like, and has an inner diameter Ri, which is shorter than a diameter 2×rp of the groove bottom 29 of the mounting groove 28, and an outer diameter Re, which is larger than the inner diameter Rj (See FIG. 1) of the housing 4.

The elastic rings 3 have the inner diameter Ri shorter than the diameter 2×rp of the groove bottom 29 of the mounting groove 28. Thus, when the elastic rings 3 are mounted in the mounting grooves 28 of the bush body 2, the elastic rings 3 biases the bush body 2 in the direction of contracting the diameter of the bush body 2 and tightens the rack bar 5 inserted in the bush body 2. Further, the elastic rings 3 have the outer diameter Re larger than the inner diameter Rj of the housing 4. Therefore, when the rack bush 1 is housed in the housing 4, the elastic rings 3 come in pressed contact with the inner peripheral surface 40 of the housing 4, and accordingly is compressively deformed. As a result, the rack bush 1 is fitted in the housing 4.

In FIG. 1, a reaction force supporting surface 42 is the inner peripheral surface 40 of the housing 4 opposed to the input direction of the reaction force N inputted to the rack bar 5 from a tire (not shown) via a tie rod (not shown) linked to the rack bar 5, and is an area, where the greatest reaction force generates against to the reaction force N inputted to the rack bar 5 in the inner peripheral surface 40 of the housing 4. The rack bush 1 of the above configuration is positioned by the engagement between the engagement protrusion 27 of the bush body 2 and the engagement recess (not shown) of the housing 4 so that the axis O of the bush body 2 is closer to the reaction force supporting surface 42 than the axis P of the groove bottom 29 of the mounting groove 28, or in other words, the elastic ring embedded parts 11 are positioned on the side of the reaction force supporting surface 42.

Hereinabove, one embodiment of the present invention has been described.

In the present embodiment, the axis P of the groove bottom 29 of the mounting groove 28 is shifted from the axis O of the bush body 2. By this arrangement, the rack bush 1 has the elastic ring protruding part 10, where the elastic rings 3 protrude largely from the outer peripheral surface 22 of the bush body 2, and the elastic ring embedded part 11, where the elastic rings 3 are embedded in the outer peripheral surface 22 of the bush body 2. Here, the rack bush 1 is positioned so that the elastic ring embedded part 11 is positioned on the side of the reaction force supporting surface 42.

Accordingly, on the side of the reaction force supporting surface 42 of the housing 4, the outer peripheral surface 22 of the bush body 2 is abutted against the inner peripheral surface 40 of the housing 4 without intervention of the elastic rings 3, and there is no gap between the outer peripheral surface 22 of the bush body 2 and the inner peripheral surface 40 of the housing 4. This improves the rigidity on the side of the reaction force supporting surface 42 and can suppress movement of the rack bar 5 within the housing 4 owing to the reaction force N of a tire. Thereby, the time lag from steering operation to actual change of the tire direction is reduced.

Further, it is not necessary to shorten the inner diameter Ri of each elastic ring 3 to tighten more firmly the rack bar 5 in order to improve the rigidity on the side of the reaction force supporting surface 42. Accordingly, the sliding characteristics of the rack bush 1 are not affected.

Thus, the present embodiment can provide the rack bush 1 that reduces the bad effect on the feeling of steering operation.

Further, in comparison with the conventional rack bush in which the axis P of the groove bottom 29 of the mounting groove 28 coincides with the axis O of the bush body 2, it is possible to increase the compressive deformation amount of the elastic body forming each elastic ring 3 on the side of the reaction force supporting surface opposed surface 43, which is the inner peripheral surface 40 of the housing 4 opposed to the reaction force supporting surface 42 across the axis O, and the spring force as the reaction force is applied toward the inner peripheral surface of the rack bush 1. Accordingly, the rigidity is improved not only on the side of the reaction force supporting surface 42 but also on the side of the reaction force supporting surface opposed surface 43, and the bad effect on the feeling of steering operation can be further reduced.

The present invention is not limited to the above embodiment, and can be varied variously.

For example, in the above embodiment, expressing the radius of the outer peripheral surface 22 of the bush body 2 as r0, the radius of the groove bottom 29 of the mounting groove 28 as rp, and the wire diameter of the elastic body forming each elastic ring 3 as d, displacement s between the axis P of the groove bottom 29 of the mounting groove 28 and the axis O of the bush body 2 is set so that r0+s≥rp+d. The present invention, however, is not limited to this.

It is sufficient that displacement s between the axis P of the groove bottom 29 of the mounting groove 28 and the axis O of the bush body 2 is set so that the elastic rings 3 are embedded in the outer peripheral part 22 of the bush body 2 or protrude smaller from the outer peripheral part 22 of the bush body 2 than the elastic ring protruding parts 10, in the elastic ring embedded part 11. By this arrangement, the gap between the outer peripheral surface 22 of the bush body 2 and the inner peripheral surface 40 of the housing 4 is made smaller on the side of the reaction force supporting surface 42 of the housing 4, and movement of the rack bar 5 inside the housing 4 owing to the tire's reaction force N is suppressed. Accordingly, the time lag from steering operation to actual change of the tire direction is reduced.

Figure 5A:
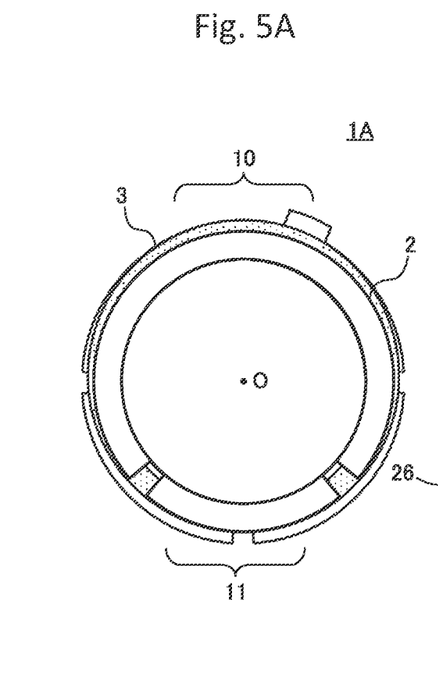
FIGS. 5(A) and 5(B) are respectively a front view and a side view of a variant 1A of the rack bush 1.
Figure 5B:
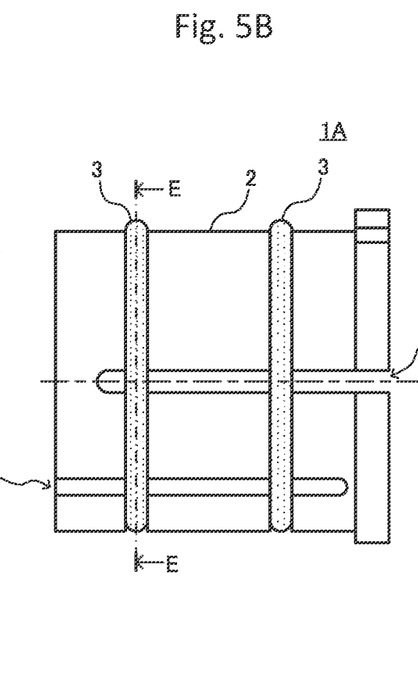
Figure 5C:
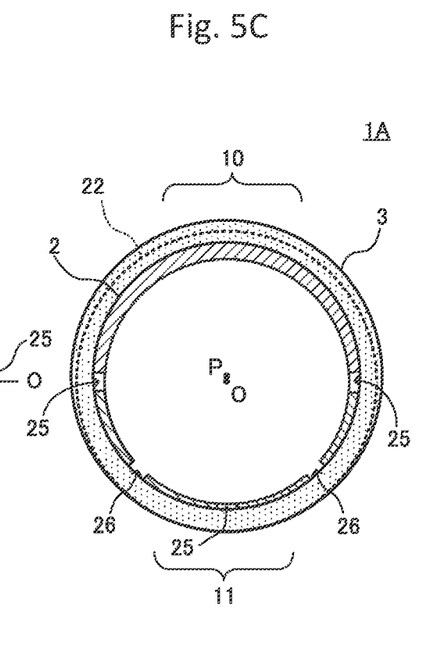
FIG. 5(C) is an E-E cross-section view of the variant 1A of the rack bush 1 shown in FIG. 5(B)

Further, in the above embodiment, as shown in a variant 1A of the rack bush 1 shown in FIGS. 5(A)-5(C), the first slits 25 and the second slits 26 can be omitted from the bush body 2 on the side of the elastic ring protruding parts 10 (the side of the axis P of the groove bottom 29 of the mounting groove 28 than the axis O of the bush body 2). In other words, the first slits 25 and the second slits 26 can be arranged only on the side of the elastic ring embedded parts 11 (the side of the axis O of the bush body 2 than the axis P of the groove bottom 29 of the mounting groove 28). By this arrangement, it is possible to avoid escape of the elastically-deformed elastic rings 3 into the first slits 25 and the second slits 26 on the side of the reaction force supporting surface opposed surface 43 and to increase furthermore the compressive deformation amount of the elastic body forming each elastic ring 3. Thereby, the reaction force of the elastic rings 3 on the side of the reaction force supporting surface opposed surface 43 becomes larger, and the rigidity on the side of the reaction force supporting surface opposed surface 43 is improved furthermore.

Further, in the above embodiment, a plurality of first slits 25 are formed in the bush body 2 along the direction of the axis O from the one end surface 23 toward the other end surface 24, and a plurality of second slits 26 are formed along the direction of the axis O from the other end surface 24 toward the one end surface 23. The present invention, however, is not limited to this. It is good enough if the bush body 2 can be freely expanded and contracted in radial direction. For example, the bush body 2 may have only the first slits 25 or only the second slits 26. Further, in the above embodiment, the bush body 2 has the cylindrical shape. However, it is good enough if the bush body 2 has a tubular shape adapted to the shape of the rack bar 5 to be inserted.

REFERENCE SIGNS LIST

1, 1A: rack bush; 2: bush body; 3: elastic ring; 4: housing; 5: rack bar; 6: lid; 10: elastic ring protruding part; 11: elastic ring embedded part; 20: inner peripheral surface of the bush body 2; 21: sliding surface of the bush body 2; 22: outer peripheral surface of the bush body 2; 23, 24: end surface of the bush body 2; 25: first slit; 26: second slit; 27: engagement part; 28: mounting groove; 29: groove bottom of the mounting groove 28; 40: inner peripheral surface of the housing 4; 41: end surface of the housing 4; 42: reaction force supporting surface of the housing 4; and 43: reaction force supporting surface opposed surface of the housing 4.

The invention claimed is:

1. A rack-and-pinion steering mechanism, comprising:
    a rack bush configured to support a load applied to a rack bar while allowing movement of the rack bar in an axial direction, the rack bush comprising:
        a bush body capable of freely expanding and contracting in a radial direction, the bush body having a mounting groove formed in an outer peripheral surface in a circumferential direction, an axis of the mounting groove being shifted from an axis of the bush body; and
        an elastic ring mounted in the mounting groove,
        wherein an amount of deviation of the axis of the mounting groove from the axis of the bush body is set so that a sum of a radius of the outer peripheral surface of the bush body and the amount of deviation of the axis of the mounting groove from the axis of the bush body is larger than or equal to a sum of a radius of a groove bottom of the mounting groove and a wire diameter of an elastic body constituting the elastic ring; and
    a cylindrical housing, which houses the rack bush while restricting movement of the rack bush in the axial direction,
    wherein:
        the rack bush is housed in the housing so that the axis of the bush body is located closer to a reaction force supporting surface, which is an inner peripheral surface of the housing opposed to an input direction of a reaction force inputted to the rack bar from a tire via a tie rod linked to the rack bar, than the axis of the mounting groove.

2. A rack-and-pinion steering mechanism of claim 1, wherein the bush body has at least one slit formed from one end surface toward the other end surface.

3. A rack-and-pinion steering mechanism of claim 2, wherein the at least one slit is a plurality of slits, and the slits are arranged in a circumferential direction of the bush body on the side of the axis of the bush body.

* * * * *